(12) United States Patent
Bae et al.

(10) Patent No.: US 11,238,771 B2
(45) Date of Patent: Feb. 1, 2022

(54) DISPLAY DRIVER CIRCUIT FOR SYNCHRONIZING OUTPUT TIMING OF IMAGES IN LOW POWER STATE

(71) Applicant: Samsung Electronics Co., Ltd., Gyeonggi-do (KR)

(72) Inventors: Jongkon Bae, Gyeonggi-do (KR); Yohan Lee, Gyeonggi-do (KR); Yunpyo Hong, Gyeonggi-do (KR); Dongkyoon Han, Gyeonggi-do (KR)

(73) Assignee: Samsung Electronics Co., Ltd

( * ) Notice: Subject to any disclaimer, the term of this patent is extended or adjusted under 35 U.S.C. 154(b) by 53 days.

(21) Appl. No.: 16/772,476

(22) PCT Filed: Dec. 17, 2018

(86) PCT No.: PCT/KR2018/016013
§ 371 (c)(1),
(2) Date: Jun. 12, 2020

(87) PCT Pub. No.: WO2019/124905
PCT Pub. Date: Jun. 27, 2019

(65) Prior Publication Data
US 2020/0388202 A1 Dec. 10, 2020

(30) Foreign Application Priority Data
Dec. 20, 2017 (KR) .................. 10-2017-0176085

(51) Int. Cl.
*G09G 5/377* (2006.01)
*G06T 11/60* (2006.01)
(Continued)

(52) U.S. Cl.
CPC ............. *G09G 3/20* (2013.01); *G06F 1/3265* (2013.01); *G06F 3/147* (2013.01); *G09G 5/10* (2013.01);
(Continued)

(58) Field of Classification Search
CPC ........ G09G 3/20; G09G 5/10; G09G 2310/08; G09G 2320/062; G09G 3/00; G09G 3/16;
(Continued)

(56) References Cited

U.S. PATENT DOCUMENTS 5,649,173 A 7/1997 Lentz
5,790,134 A 8/1998 Lentz
(Continued)

FOREIGN PATENT DOCUMENTS

KR 1019980702804 8/1998
KR 100262453 8/2000
(Continued)

OTHER PUBLICATIONS

PCT/ISA/210 Search Report issued on PCT/KR2018/016013, dated Jun. 27, 2019, pp. 5.
(Continued)

*Primary Examiner* — Chanh D Nguyen
*Assistant Examiner* — Nguyen H Truong
(74) *Attorney, Agent, or Firm* — The Farrell Law Firm, P.C.

(57) ABSTRACT

An electronic device according to an embodiment of the present invention comprises: a housing; a display panel disposed inside the housing; a display driver circuit electrically connected to the display panel; and a processor for generating a background image output through the display panel to transmit the same to the display driver circuit.

15 Claims, 14 Drawing Sheets

(51) Int. Cl.
*G09G 3/20* (2006.01)
*G06F 1/3234* (2019.01)
*G06F 3/147* (2006.01)
*G09G 5/10* (2006.01)

(52) U.S. Cl.
CPC ... *G09G 2310/08* (2013.01); *G09G 2320/062* (2013.01)

(58) Field of Classification Search
CPC .... G09G 3/147; G09G 3/0354; G09G 3/0484; G09G 3/0488; G09G 5/00; G06F 1/3265; G06F 3/147; G06F 1/3234; G06T 3/00; G06T 13/00; G06T 7/00; G06T 11/60; G06T 1/16; H04N 5/232; H04N 5/265; G08B 21/18; G08B 5/22; H03K 17/945; H04M 1/02; H04M 1/725
See application file for complete search history.

(56) References Cited

U.S. PATENT DOCUMENTS

| | | | |
|---|---|---|---|
| 7,492,371 B2 | 2/2009 | Jeffrey et al. | |
| 10,269,156 B2 | 4/2019 | Dunn et al. | |
| 10,366,519 B2 | 7/2019 | Lee et al. | |
| 10,467,610 B2 | 11/2019 | Dunn et al. | |
| 10,503,280 B2 | 12/2019 | Yoo et al. | |
| 2007/0126748 A1 | 6/2007 | Jeffrey et al. | |
| 2012/0081529 A1* | 4/2012 | Seo | H04N 7/183 348/61 |
| 2013/0335450 A1 | 12/2013 | Han et al. | |
| 2015/0156312 A1* | 6/2015 | Jung | G06F 1/1628 455/566 |
| 2016/0357406 A1 | 12/2016 | Lee et al. | |
| 2016/0358357 A1 | 12/2016 | Dunn et al. | |
| 2017/0308226 A1 | 10/2017 | Yoo et al. | |
| 2019/0139015 A1 | 5/2019 | Dunn et al. | |

FOREIGN PATENT DOCUMENTS

| | | |
|---|---|---|
| KR | 1020060056469 | 5/2006 |
| KR | 101302130 | 8/2013 |
| KR | 1020130142310 | 12/2013 |
| KR | 1020160143312 | 12/2016 |
| KR | 1020170119967 | 10/2017 |

OTHER PUBLICATIONS

PCT/ISA/237 Written Opinion issued on PCT/KR2018/016013, dated Mar. 29, 2019, pp. 6.
European Search Report dated Oct. 5, 2020 issued in counterpart application No. 18892773.5-1210, 10 pages.

* cited by examiner

<WQHD>

<FHD>

DISPLAY DRIVER CIRCUIT FOR SYNCHRONIZING OUTPUT TIMING OF IMAGES IN LOW POWER STATE

PRIORITY

This application is a National Phase Entry of PCT International Application No. PCT/KR2018/016013 which was filed on Dec. 17, 2018, and claims priority to Korean Patent Application No. 10-2017-0176085, which was filed on Dec. 20, 2017, the content of each of which is incorporated herein by reference.

TECHNICAL FIELD

Embodiments disclosed in the disclosure relate to a technique for synchronizing output timings of images.

BACKGROUND ART

As display manufacturing technology has been developed, electronic devices (e.g., smart phones) on which displays are mounted have been widely used. Such an electronic device may output images (e.g., photos) through a display or receive a user input.

Recently, as functions that can be performed through an electronic device increase, the electronic device may merge and output several images. For example, in an always-on-display (AOD) state, an electronic device may merge a watch image and a lock screen and output the merged image through a display.

DISCLOSURE

Technical Problem

In a process in which several images are merged and output, the timings of outputting the images may be different from each other. For example, some of the images may be generated by an application processor and output through a display driver integrated circuit and a display panel. The remaining images may be directly output from the display driver integrated circuit through a display panel. That is, because paths in which images are output are different, screen flickering may occur, or images may be output at a timing not intended by a user.

Aspects of the disclosure are to address at least the above-mentioned problems and/or disadvantages and to provide at least the advantages described below. Accordingly, an aspect of the disclosure is to provide an electronic device

Technical Solution

According to an embodiment of the disclosure, an electronic device includes a housing, a display panel that is arranged in the housing, a display driving circuit that is electrically connected to the display panel, and a processor that generates a background image output through the display panel and transmits the background image to the display driving circuit, wherein the display driving circuit may determine whether a first object is displayed in a first area of the background image that is not exposed to an outside by the housing when the background image is received, generate a partial image having a size smaller than a size of the background image when the first object is not displayed as the determination result, and merge the partial image and a second area of the background image that is exposed to the outside and output a merging result through the display panel.

According to another embodiment of the disclosure, an electronic device includes a display panel, a display driving circuit that is electrically connected to the display panel, and a processor that generates a background image output through the display panel and transmits the background image to the display driving circuit, wherein the display driving circuit may determine whether an object is displayed on the background image when the background image is received, generate a partial image corresponding to the object when the object is not displayed as the determination result, and output the partial image to the background image through the display panel.

According to still another embodiment of the disclosure, a display driving circuit includes a receiving circuit that sequentially receives a first background image and a second background image from an external processor, an up-scaler that is electrically connected to the receiving circuit and extract a first tracking point and a second tracking point generated in some areas of the first and second background images, and a controller that is electrically connected to the up-scaler, wherein the controller may generate a first partial image when the first background image is received from the receiving circuit, output the first partial image at a position corresponding to a coordinate value of the first tracking point on the first background image, generate a second partial image when the second background image is received from the receiving circuit, calculate a difference between the coordinate values of the first and second tracking points, and move the second partial image by a distance corresponding to the difference between the coordinate values of the first and second tracking points and output the second partial image onto the second background image.

Advantageous Effects

According to the embodiments of the disclosure, it is possible to synchronize output timings of images.

In addition, various effects that are directly or indirectly understood through the present disclosure may be provided.

MODE FOR INVENTION

Figure 1:
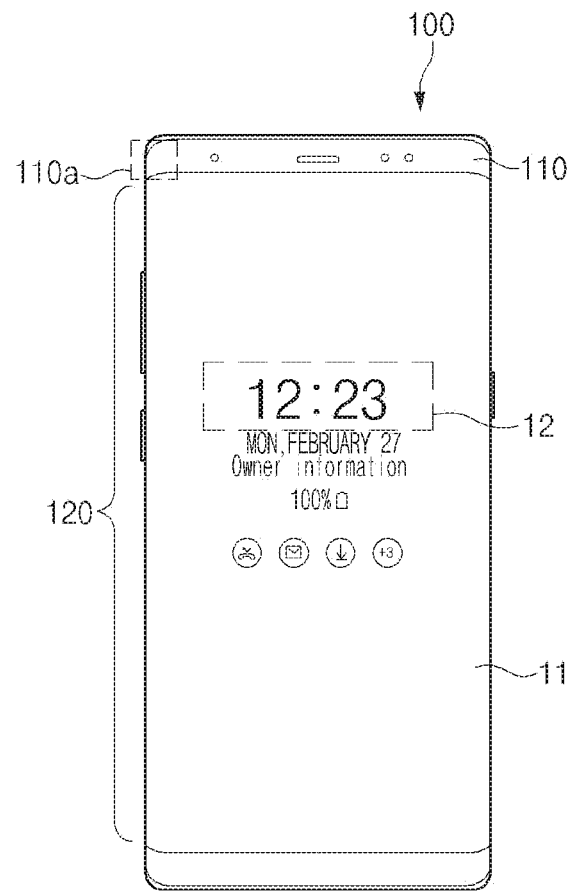
FIG. 1 is a view illustrating an electronic device according to an embodiment.

FIG. 1 is a view illustrating an electronic device according to an embodiment.

Referring to FIG. 1, an electronic device 100 may include a housing 110 and a display 120.

The housing 110 may form an outer appearance of the electronic device 100 to protect various components included in the electronic device 100 from external impact. For example, the housing 110 may protect the display 120, a printed circuit board and the like included in the electronic device 100 from external impact.

The display 120 may be arranged inside the housing 110. The display 120 may receive a user input (e.g., a touch, a gesture, a hovering, or the like) or output various images (e.g., text images, icons, widgets, symbols, or the like).

According to an embodiment, the electronic device 100 may merge and output a background image 11 and a partial image 12. The electronic device 100 may synchronize an output timing of the background image 11 with an output timing of the partial image 12 in the process of merging and outputting the background image 11 and the partial image 12. In the disclosure, the background image 11 may mean an image output through the entire area of the display 120, and the partial image 12 may mean an image output through a partial area of the display 120.

The electronic device according to a comparative example cannot synchronize the output timing of the background image with the output timing of the partial image. Accordingly, screen flickering may occur, or images may be output at a timing unintended by the user. However, the electronic device 100 according to an embodiment of the disclosure may synchronize the output timing of the background image 11 with the output timing of the partial image 12. Accordingly, the electronic device 100 may prevent screen flickering from occurring and output the background image 11 and the partial image 12 at a timing intended by the user.

Figure 2A:
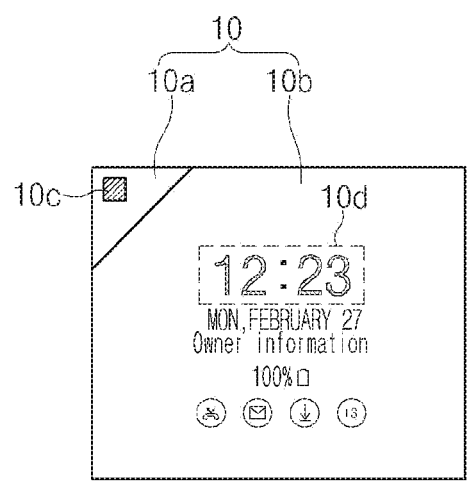
FIG. 2A is a view illustrating a first background image according to an embodiment.
Figure 2B:
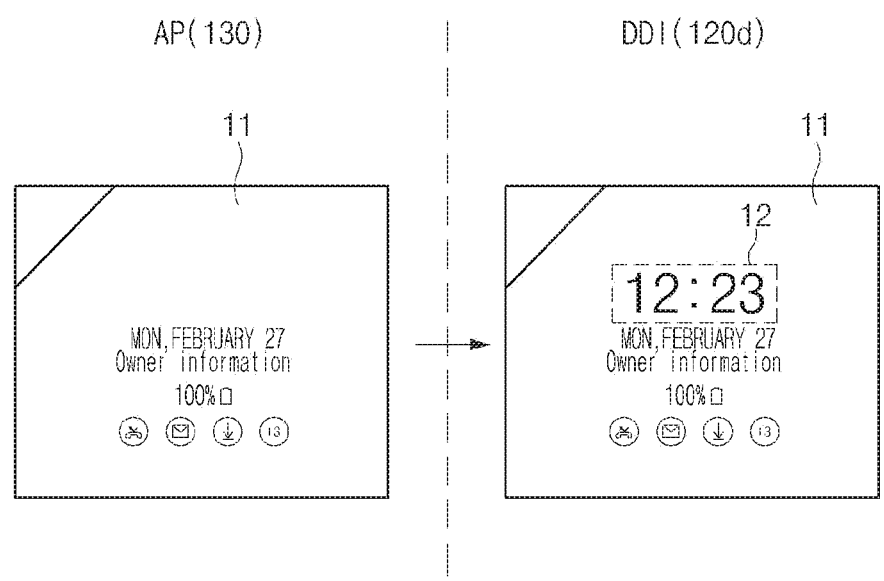
FIG. 2B is a view illustrating a second background image and a partial image according to an embodiment.

FIG. 2A is a view illustrating a first background image according to an embodiment. FIG. 2B is a view illustrating a second background image and a partial image according to an embodiment. FIGS. 2A and 2B are views illustrating in detail a process of merging a partial image into a background image.

Referring to FIGS. 2A and 2B, a first background image 10 may include a first area 10*a* not exposed to an outside of the electronic device 100 and a second area 10*b* exposed to an outside of the electronic device 100. In other words, a portion of the display 120 may not be exposed to an outside due to an edge 110*a* or an area adjacent to the edge 110*a* of the housing 110 illustrated in FIG. 1. The first area 10*a* is output through the display 120, but may mean an area covered by the edge 110*a* of the housing 110 or an area adjacent to the edge 110*a*. The second area 10*b* may mean an area output through the display 120 and exposed to an outside the electronic device 100.

As another embodiment, the first area 10*a* may be an area that is not output through the display 120. For example, when a size of the display 120 is smaller than the first background image 10, a portion of the first background image 10 may not be output through the display 120. The first area 10*a* may mean an area of the first background image 10 that is not output through the display 120.

As still another embodiment, the first area 10*a* may be located at a corner of the first background image 10. Although the first area 10*a* which is located at a left upper end of the first background image 10 is illustrated in FIG. 2A, the first area 10*a* may be located at a right upper end of the first background image 10. When the first area 10*a* is located at the left upper end and/or right upper end of the first background image 10, the first area 10*a* is recognized or scanned first by the display 120 than the partial image 12.

According to an embodiment, the electronic device 100 (or a processor 130 of FIG. 3) may generate a first object 10*c* in the first area 10*a*. In the disclosure, the first object 10*c* may mean an image generated in the first area 10*a*. For example, the first object 10*c* may include a square-shaped image, a triangular-shaped image, or the like. Because the first object 10*c* is not exposed to an outside of the electronic device 100, even though the first object 10*c* has an arbitrary shape, the aesthetic sensibility of a user may not be deteriorated.

According to an embodiment, the electronic device 100 (or the processor 130 of FIG. 3) may generate a second object 10*d* in the second area 10*b*. In the disclosure, the second object 10*d* may mean an image generated in the second area 10*b*. For example, the second object 10*d* may be an image, such as a clock image, a calendar image, a message image, and the like, which is exposed to an outside of the electronic device 100.

Figure 3:
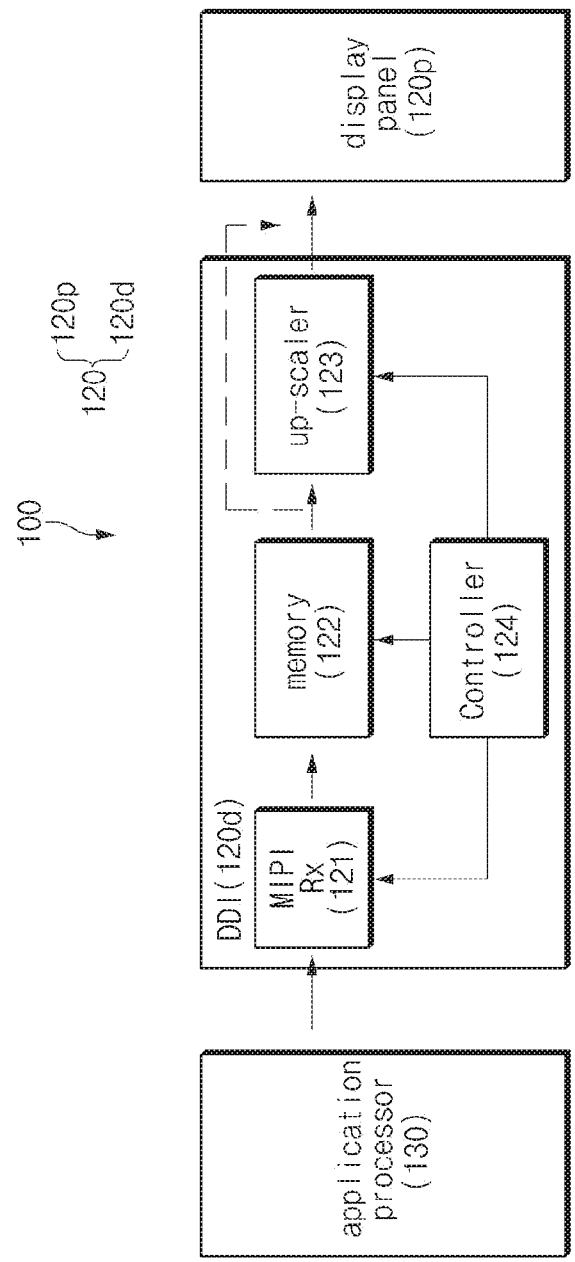
FIG. 3 is a block diagram according to an embodiment.

When the first background image 10 including the first and second objects 10*c* and 10*d* is generated, the electronic device 100 (or the processor 130 of FIG. 3) may transmit the first background image 10 to the display 120 (or a DDI 120*d* of FIG. 3). The display 120 may determine whether the first object 10*c* and/or the second object 10*d* exists in the first background image 10. As the determination result, because the first and second objects 10*c* and 10*d* exist in the first background image 10, the display 120 outputs the first background image 10 without merging the partial image 12.

According to an embodiment, the electronic device 100 (or the processor 130 of FIG. 3) may generate the second background image 11 after generating the first background image 10, and transmit the second background image to a display (or the DDI 120*d* of FIG. 3). The second background image 11 may mean an image in which the first object 10*c* and/or the second object 10*d* are removed from the first background image 10.

According to an embodiment, the display 120 (or the DDI 120*d* of FIG. 3) may determine whether the first object 10*c* and/or the second object 10*d* exists in the received second background image 11. When the first object 10*c* and/or the second object 10*d* does not exist in the second background image 11, the display 120 may merge the partial image 12 into the second background image 11 and output it.

According to an embodiment, when the first object 10*c* and/or the second object 10*d* does not exist in the second background image 11, the display 120 (or the DDI 120*d* of FIG. 3) may generate the partial image 12. The display 120 may merge the generated partial image 12 to a location where the second object 10*d* was present. The partial image 12 and the background image 11 merged may be output through the display 120.

As another embodiment, when the first object 10*c* and/or the second object 10*d* does not exist in the second background image 11, the display 120 (or the DDI 120d of FIG. 3) may select the partial image 12 stored in a memory (e.g., a memory 122 of FIG. 3). The display 120 may merge the selected partial image 12 to a location where the second object 10d is present. The partial image 12 and the background image 11 merged may be output through the display 120.

In the above-described embodiment, the display 120 (or the DDI 120d of FIG. 3) may receive control information from a processor (e.g., a processor 130 of FIG. 3). The control information may include address information of the memory (e.g., the memory 122 of FIG. 3), current time information, and the like. The display 120 may select a partial image stored in the memory 122 based on the control information. According to an embodiment of the disclosure, the partial image 12 is merged into a background image (e.g., the second background image 11) based on whether the first object 10c and/or the second object 10d exists in the background image 11, such that it is possible to synchronize the output timing of the background image 11 with the output timing of the partial image 12. Accordingly, the electronic device 100 may prevent screen flickering and output the background image 11 and the partial image 12 at a timing intended by the user.

Meanwhile, the embodiments illustrated in FIGS. 2A and 2B are only embodiments, and the embodiments of the disclosure are not limited to those illustrated in FIGS. 2A and 2B. For example, the electronic device 100 may generate the first background image in which the first object 10c does not exist and transmit the first background image to the display 120. The first background image in which the first object 10c does not exist may be output through the display 120.

After generating the first background image without the first object 10c, the electronic device 100 may generate a second background image with the first object 10c. The second background image with the first object 10c may be transmitted to the display 120. The display 120 may determine whether the first object 10c exists in the second background image, and when the first object 10c exists as the determination result, the partial image 12 may be merged into the second background image. The partial image 12 and the second background image merged may be output through the display 120.

Figure 2C:
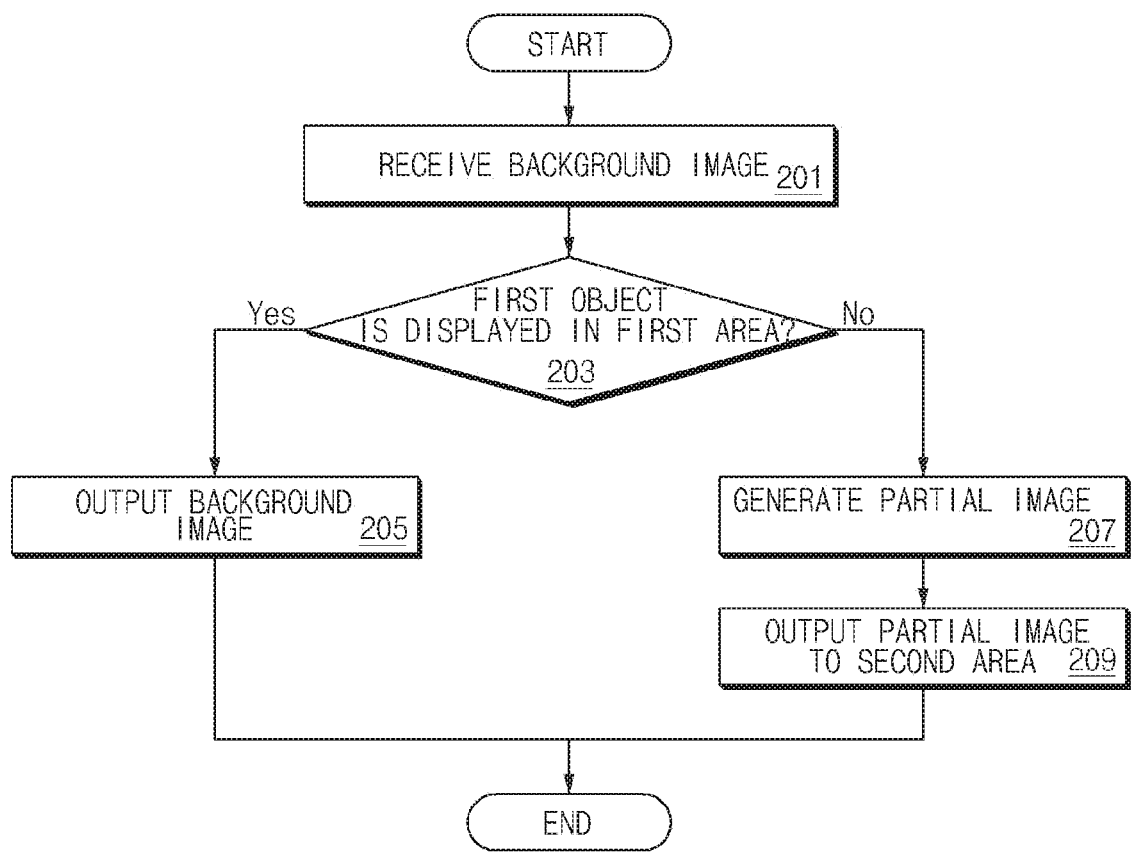
FIG. 2C is a flowchart illustrating an operation of an electronic device according to an embodiment.

FIG. 2C is a flowchart illustrating an operation of an electronic device according to an embodiment. FIG. 2C illustrates a flowchart of an operation of the electronic device 100 shown in FIG. 1.

Referring to FIG. 2C, in operation 201, the display 120 (or the DDI 120d of FIG. 3) may receive a background image from a processor (e.g., the processor 130 of FIG. 3). For example, the display 120 may sequentially receive the first and second background images 10 and 11. The first background image 10 may include the first object 10c in the first area 10a, and the second background image 11 may not include the first object 10c.

In operation 203, the display 120 (or the DDI 120d of FIG. 3) may determine whether the first object 10c is displayed in the first area 10a. Unlike shown in FIG. 2C, the display 120 may determine whether the second object 10d is displayed in the second area 10b.

When the first object 10c is displayed in the first area 10a, in operation 205, the display 120 (or the DDI 120d of FIG. 3) may output a background image. For example, because the first object 10c is displayed on the first background image 10, the display 120 may output the partial image 12 to the first background image 10 without merging.

When the first object 10c is not displayed in the first area 10a, in operation 207, the display 120 (or the DDI 120d of FIG. 3) may generate the partial image 12. For example, because the first object 10c is not displayed on the second background image 11, the display 120 may generate the partial image 12. Although it is shown in FIG. 2C that the display 120 generates the partial image 12, the display 120 may select the partial image 12 stored in the memory (e.g., the memory 122 of FIG. 3).

In operation 209, the display 120 (or DDI 120d of FIG. 3) may output the generated partial image 12 into the second area. For example, the display 120 may output the generated partial image 12 to the second area of the second background image 11.

FIG. 3 is a block diagram according to an embodiment. FIG. 3 is a block diagram illustrating hardware modules included in the electronic device 100 shown in FIG. 1.

Referring to FIG. 3, the electronic device 100 may include the processor 130 and the display 120. The display 120 may include a display driving circuit 120d and a display panel 120p.

The processor 130 may generate the first and second background images 10 and 11. When the first and second background images 10 and 11 are generated, the processor 130 may transmit the first and second background images 10 and 11 to the display driving circuit 120d. In the disclosure, the processor 130 may be referred to as an application processor (AP).

The display driving circuit 120d may include a receiving circuit 121, the memory 122, an up-scaler 123, and a controller 124. The receiving circuit 121 may receive an image generated by the processor 130. For example, the receiving circuit 121 may receive the first and second background images 10 and 11 generated by the processor 130. In the disclosure, the receiving circuit 121 may be referred to as a mobile industry processor interface (MIPI) receiving module.

The memory 122 may store an image received by the receiving circuit 121. For example, the partial image 12 may be generated by the processor 130 and transmitted to the receiving circuit 121. In this case, the memory 122 may store the partial image 12. In the disclosure, the memory 122 may be referred to as a frame buffer, or the like.

The up-scaler 123 may enlarge the image received by the receiving circuit 121 at a specified magnification. For example, the up-scaler 123 may enlarge the first and second background images 10 and 11, and/or the partial image 12 at a specified magnification. According to an embodiment, the operation performed by the up-scaler 123 may be bypassed. In this case, an image selected from the memory 122 may be output to the display panel 120p.

The controller 124 may determine whether the first object 10c and/or the second object 10d exists in the first and second background images 10 and 11. As the determination result, when the first object 10c and/or the second object 10d does not exist, the partial image 12 may be merged into the first background image 10 and/or the second background image 11.

For example, because the first and second objects 10c and 10d exist in the first background image 10, the controller 124 may not merge the partial image 12. However, because the first and second objects 10c and 10d do not exist in the second background image 11, the partial image 12 may be merged into the second background image 11. The partial image 12 may be generated by the controller 124 or may be selected from the memory 122 by the controller 124. The partial image 12 and the background image 11 merged may be output through the display panel 120p.

According to an embodiment of the disclosure, the partial image 12 is merged into a background image (e.g., the second background image 11) based on whether the first object 10c and/or the second object 10d exists in the background image 11, such that it is possible to synchronize the output timing of the background image 11 with the output timing of the partial image 12. Accordingly, the electronic device 100 may prevent screen flickering and output the background image 11 and the partial image 12 at a timing intended by the user.

In the disclosure, the same contents as described with reference to FIGS. 1 to 3 may be applied to components having the same reference numerals as the components included in the electronic device 100 illustrated in FIGS. 1 to 3.

Figure 4A:
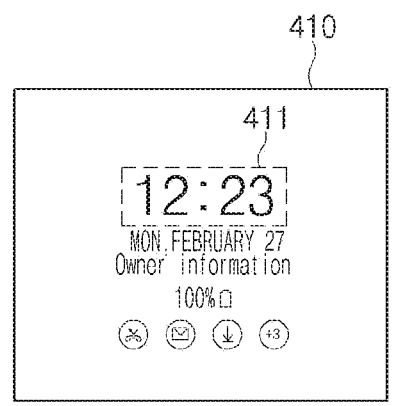
FIG. 4A is a view illustrating a first background image according to another embodiment.
Figure 4B:
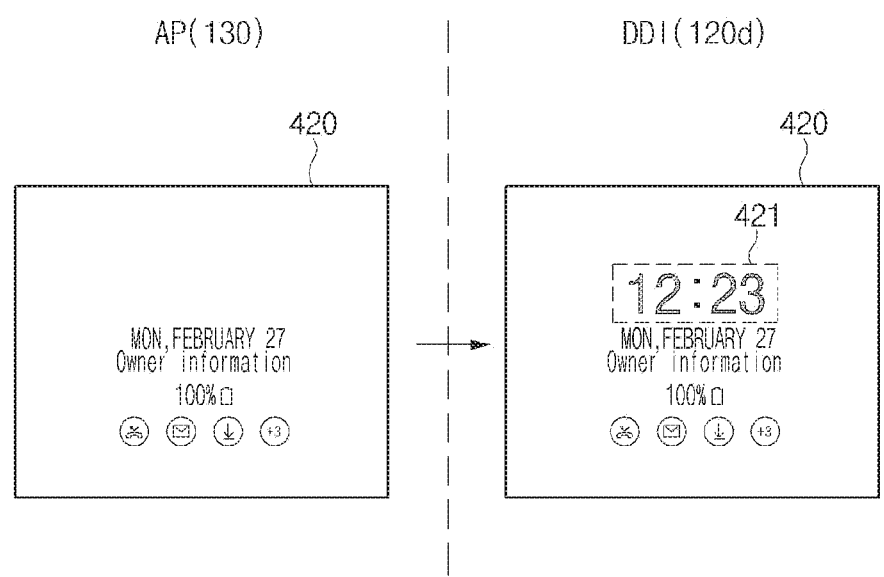
FIG. 4B is a view illustrating a second background image and a partial image according to another embodiment.

FIG. 4A is a view illustrating a first background image according to another embodiment. FIG. 4B is a view illustrating a second background image and a partial image according to another embodiment. FIGS. 4A and 4B are views illustrating in detail a process of merging a partial image into a background image.

Referring to FIGS. 4A and 4B, the processor 130 may generate a first background image 410. Unlike the first background image 10 shown in FIG. 2A, the first background image 410 shown in FIG. 4A does not include an area (e.g., the first area 10a) covered by the housing 110. Meanwhile, the first background image 410 may include an object 411. The object 411 is an image, such as a clock image, a calendar image, or the like, which is exposed to an outside of the electronic device 100, and may be referred to as the second object 10d of FIG. 2A. When the first background image 410 is generated, the processor 130 may transmit the first background image 410 to the display driving circuit 120d. The controller 124 may determine whether the object 411 exists in the first background image 410 and may output the first background image 410 without merging a partial image 421 when the object 411 exists. Because the object 411 exists in FIG. 4B, the controller 124 may output the first background image 410 through the display panel 120p without merging the partial image 421.

According to an embodiment, after the first background image 410 is generated, the processor 130 may generate a second background image 420 and transmit the second background image 420 to the display driving circuit 120d. The second background image 420 may mean an image in which the object 411 is removed from the first background image 410.

When the second background image 420 is transmitted, the controller 124 may determine whether the object 411 exists in the second background image 420, and when the object 411 does not exist, the controller 124 may merge the partial image 421 into the second background image 420. In FIG. 4B, because the object 411 does not exist in the second background image 420, the controller 124 may merge the partial image 421 into the second background image 420 and output it through the display panel 120p.

According to an embodiment, the partial image 421 may mean an image generated by the controller 124, or generated by the processor 130 and stored in the memory 122. For example, the controller 124 may generate the partial image 421 and merge the generated partial image 421 into the second background image 420. As another example, the controller 124 may select the partial image 421 stored in the memory 122 and merge the selected partial image 421 into the second background image 420.

According to an embodiment of the disclosure, the partial image 421 is merged into the background image 420 (e.g., the second background image 420) based on whether the object 411 exists in the background image, such that it is possible to synchronize the output timing of the background image 420 with the output timing of the partial image 421. Accordingly, the electronic device 100 may prevent screen flickering and output the background image 420 and the partial image 421 at a timing intended by the user.

Figure 5:
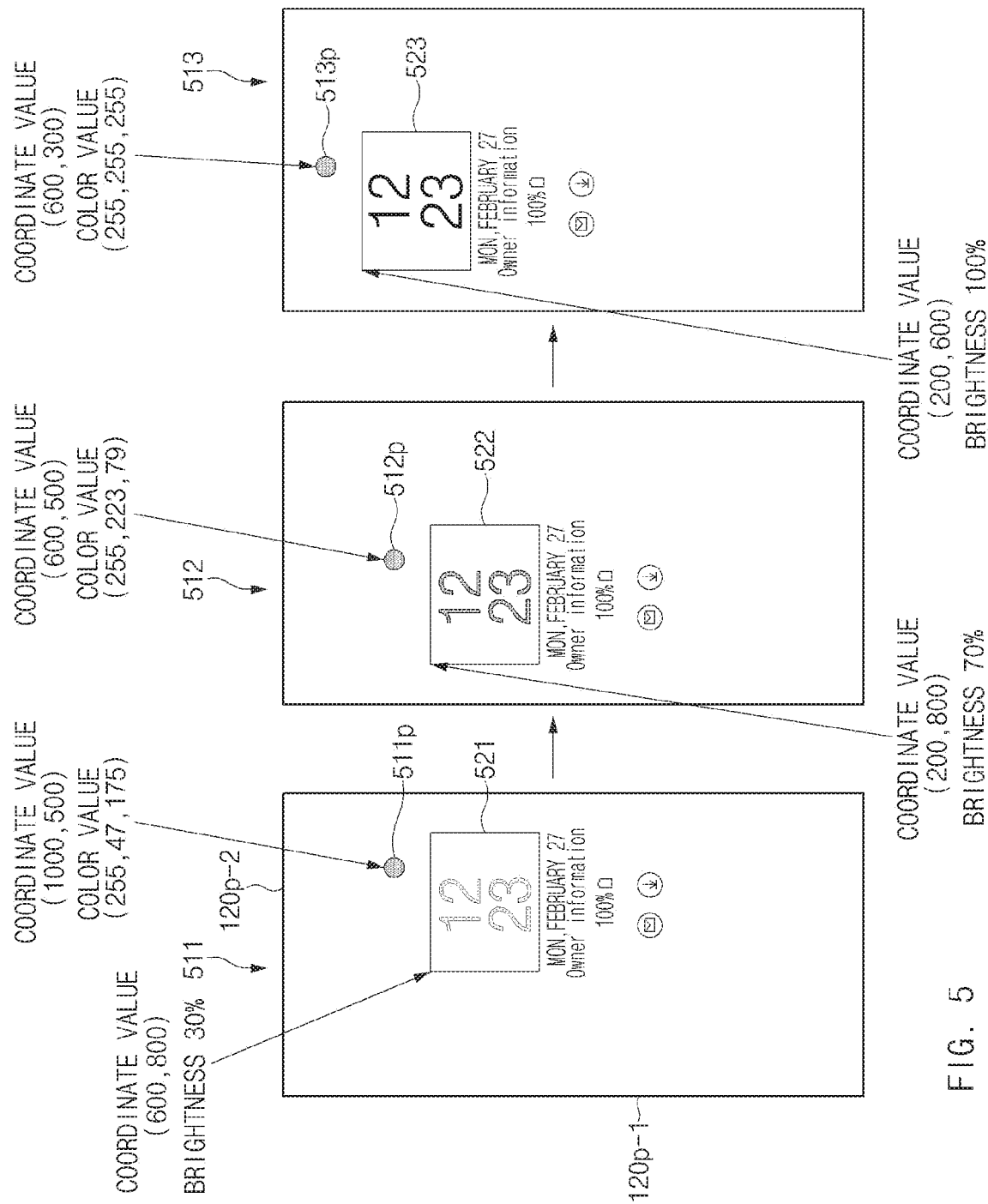
FIG. 5 is a view illustrating a process of merging a partial image into a background image according to still another embodiment.

FIG. 5 is a view illustrating a process of merging a partial image into a background image according to still another embodiment. The embodiments illustrated in FIGS. 1 to 4 are related to an embodiment of merging a partial image into a background image based on whether an object exists in the background image. The embodiments to be described below relate to embodiments in which tracking points between frames are compared with each other and a partial image is merged into a background image based on the comparison result. In addition, embodiments to be described below relate to an embodiment of changing the position and brightness of a partial image.

In the disclosure, a tracking point (e.g., 511p) may refer to data for adjusting a timing of merging a partial image 521 into a background image (e.g., 511). The tracking point (e.g., 511p) is only data for adjusting a timing, and thus may not be output through the display 120. That is, because the tracking point (e.g., 511p) is not output through the display 120, a user may not be able to recognize the tracking point (e.g., 511p).

Referring to FIG. 5, the processor 130 may generate a first background image 511 and transfer the first background image 511 to the display driving circuit 120d. The first background image 511 may include a first tracking point 511p. The processor 130 may generate second and third background images 512 and 513, and may sequentially transmit the second and third background images 512 and 513 to the display driving circuit 120d. The second and third background images 512 and 513 may include second and third tracking points 512p and 513p.

The display driving circuit 120d (or the controller 124) may merge the first partial image 521 into the first background image 511 and output the merged image through the display panel 120p. In addition, the display driving circuit 120d may merge second and third partial images 522 and 523 into the second and third background images 512 and 513 and output the merged images through the display panel 120p. The first to third partial images 521 to 523 may be generated by the display driving circuit 120d, or may be generated by the processor 130 and stored in the display driving circuit 120d.

According to an embodiment, the display driving circuit 120d (or the controller 124) may calculate a difference between the coordinate values of the first and second tracking points 511p and 512p. When the difference is calculated, the display driving circuit 120d may move the second partial image 522 on the second background image 512 by a distance corresponding to the difference between the coordinate values. When the second partial image 522 is moved, the second partial image 522 and the second background image 512 may be merged and output through the display panel 120p.

For example, when the coordinate value of the first tracking point 511p is (1000, 500) and the coordinate value of the second tracking point 512p is (600, 500), the display driving circuit 120d may move the second partial image 522 to (200, 800). In other words, the display driving circuit 120d may move the second partial image 522 from the coordinate value (600, 800) of the first partial image 521 by the distance (−400, 0) corresponding to the difference between the coordinate values of the first and second tracking points 511p and 512p. When the second partial image 522 is moved, the second partial image 522 and the second background image 512 may be merged and output through the display panel 120p.

In the disclosure, the coordinate value may mean a position value of a point where a data line and a gate line intersect. For example, because the coordinate value of the first tracking point 511p is (1000, 500), the first tracking point 511p is located at the point where the data line located at the 1,000-th position from the left edge 1201-1 of the display panel 120p and the gate line located at the 500-th position from the upper edge 120p-2 of the display panel 120p intersect.

As another embodiment, the display driving circuit 120d (or the controller 124) may calculate a difference between the coordinate values of the second and third tracking points 512p and 513p. When the difference is calculated, the display driving circuit 120d may move the third partial image 523 on the third background image 513 by the distance corresponding to the difference between the coordinate values. When the third partial image 523 is moved, the third partial image 523 and the third background image 513 may be merged and output through the display panel 120p.

For example, when the coordinate value of the second tracking point 512p is (600, 500) and the coordinate value of the third tracking point 513p is (600, 300), the display driving circuit 120d may move the third partial image 523 to (200, 600). In other words, the display driving circuit 120d may move the third partial image 523 from the coordinate value (200, 800) of the second partial image 522 by the distance (0, −200) corresponding to the difference between the coordinate values of the second and third tracking points 512p and 513p. When the third partial image 523 is moved, the third partial image 523 and the third background image 513 may be merged and output through the display panel 120p.

According to an embodiment, the display driving circuit 120d (or the controller 124) may calculate a difference between the color values of the first and second tracking points 511p and 512p. When the difference is calculated, the display driving circuit 120d may adjust the brightness of the second partial image 522 to correspond to the difference between the color values.

For example, when the color value of the first tracking point 511p is (255, 47, 175) and the color value of the second tracking point 512p is (255, 223, 79), the display driving circuit 120d may adjust the brightness of the second partial image 522 to 70% of the maximum brightness. In other words, although the brightness of the first partial image 521 is 30%, because the color value difference occurs as the location is changed from the first tracking point 511p to the second tracking point 512p, the display driving circuit 120d may adjust the brightness of the second partial image 522 to 70%.

In the disclosure, the color value may mean a grayscale value of a grayscale voltage applied to a pixel. For example, the color value may include a grayscale value applied to a red sub-pixel, a grayscale value applied to a green sub-pixel, and a grayscale value applied to a blue sub-pixel.

As another embodiment, the display driving circuit 120d (or the controller 124) may calculate a difference between the color values of the second and third tracking points 512p and 513p. When the difference is calculated, the display driving circuit 120d may adjust the brightness of the third partial image 523 to correspond to the difference between the color values.

For example, when the color value of the second tracking point 512p is (255, 223, 79) and the color value of the third tracking point 513p is (255, 255, 255), the display driving circuit 120d may adjust the brightness of the third partial image 523 to 100%. In other words, although the brightness of the second partial image 522 is 70%, because the color value difference occurs as the location is changed from the first tracking point 511p to the second tracking point 512p, the display driving circuit 120d may adjust the brightness of the third partial image 523 to 100%.

According to an embodiment of the disclosure, the output timing of the background image may be synchronized with the output timing of the partial image by merging the partial image into the background image based on the coordinate value and/or color value of the tracking point. Accordingly, the electronic device 100 may prevent screen flickering and output a background image and a partial image at a timing intended by a user.

Figure 6A:
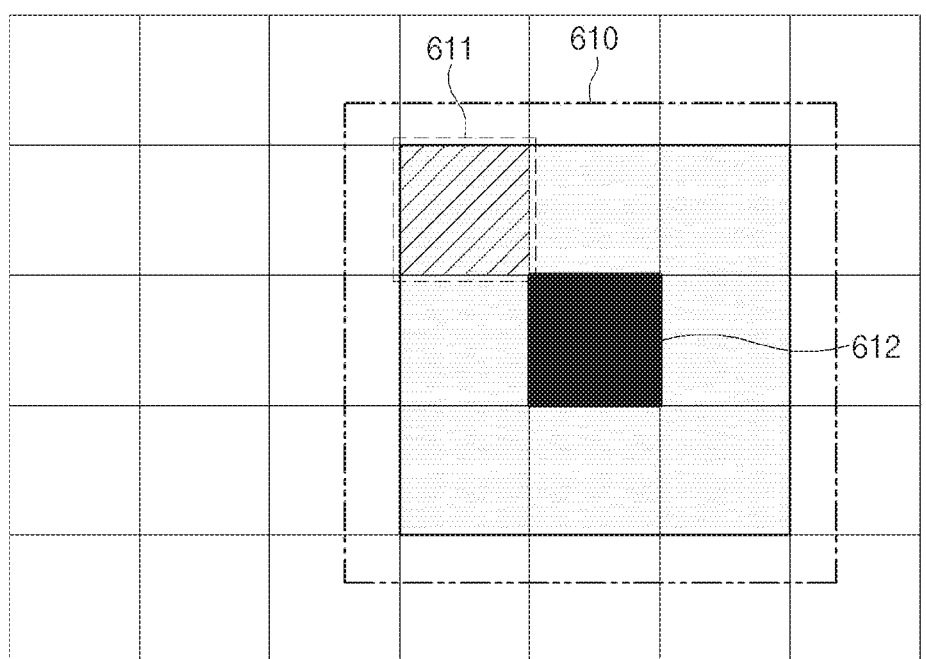
FIG. 6A is an enlarged view of a tracking point according to an embodiment.
Figure 6B:
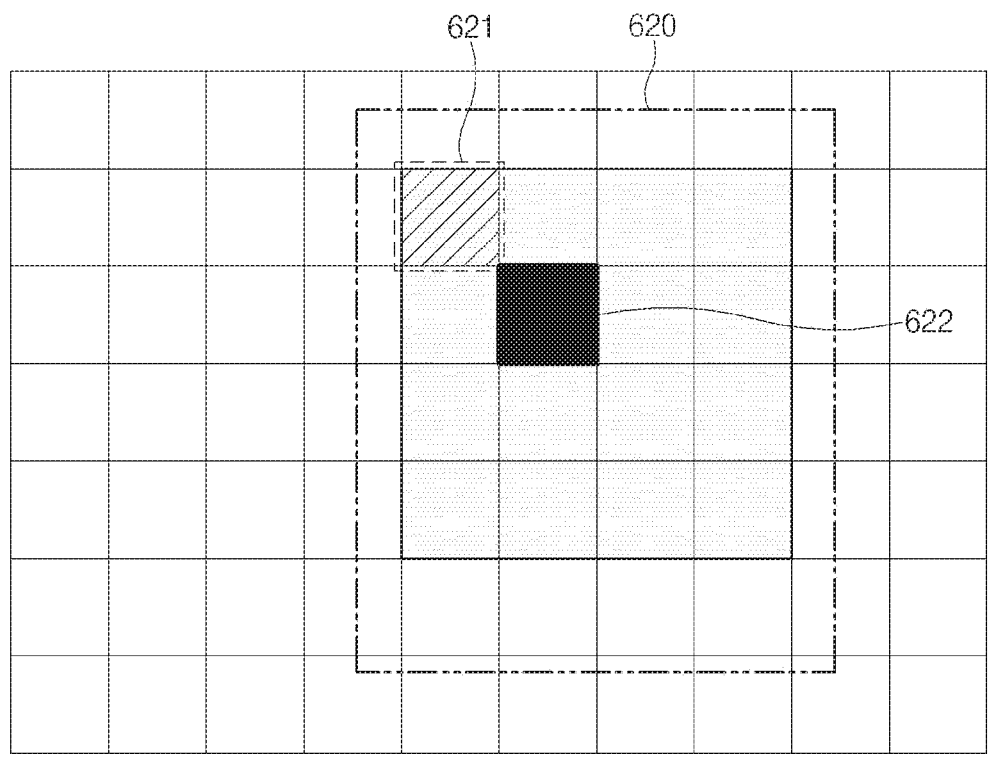
FIG. 6B is an enlarged view of a tracking point according to another embodiment.
Figure 6C:
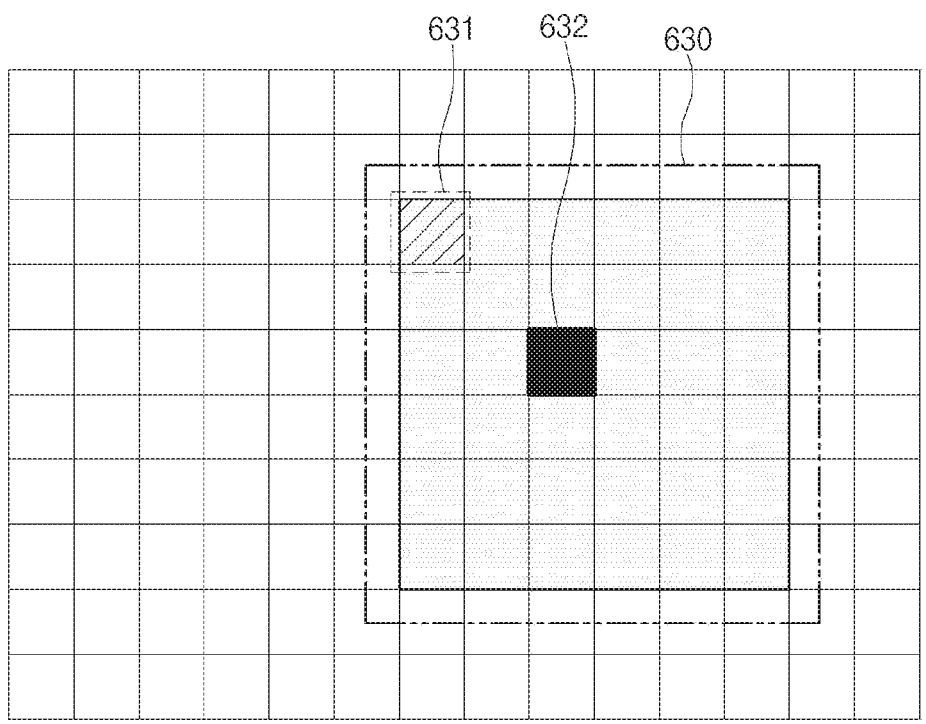
FIG. 6C is an enlarged view of a tracking point according to still another embodiment.

FIG. 6A is an enlarged view of a tracking point according to an embodiment. FIG. 6B is an enlarged view of a tracking point according to another embodiment. FIG. 6C is an enlarged view of a tracking point according to still another embodiment.

FIGS. 6A to 6C illustrate tracking points corresponding to the resolution of the display 120. For example, when the resolution of the display 120 is WQHD in FIG. 6A, when the resolution of the display 120 is FHD in FIG. 6B, and when the resolution of the display 120 is HD in FIG. 6C, FIGS. 6A to 6C are enlarged views of tracking points 610, 620, and 630.

Referring to FIGS. 6A to 6C, the display driving circuit 120d (e.g., the up-scaler 123) may enlarge the tracking points 610, 620, and 630 in the background image. The enlarged tracking points 610, 620, and 630 may include plural pieces of pixel information.

According to an embodiment, the display driving circuit 120d may determine whether pixels are matching pixels 611, 621, and 631 of the tracking points 610, 620, and 630 based on the color values of the matching pixels 611, 621, and 631. The matching pixels 611, 621, and 631 may refer to pixels first recognized by the display driving circuit 120d among the tracking points 610, 620, and 630. For example, the pixel 611 located at the left upper end in the tracking point 610 of FIG. 6A (or the pixel located at the point (0, 0)) may be a matching pixel. In the tracking point 620 of FIG. 6B and the tracking point 630 of FIG. 6C, the pixels 621 and 631 (or pixels located at the point (0, 0)) located at the left upper ends may be matching pixels.

When the tracking points 610, 620, and 630 are identified, the display driving circuit 120d may set one pixels of the tracking points 610, 620, and 630 as tracking pixels 612, 622, and 632. In the disclosure, the tracking pixels 612, 622, and 632 may mean pixels used for actual tracking within the tracking points 610, 620, and 630. For example, the pixel 612 located at point (1, 1) may be a tracking pixel in the tracking point 610 of FIG. 6A. The pixel 622 located at point (1, 1) may be a tracking pixel in the tracking point 620 of FIG. 6B. The pixel 632 located at point (2, 2) may be a tracking pixel in the tracking point 630 of FIG. 6C.

According to an embodiment, the tracking pixels 612, 622, and 632 may include red sub-pixel, green sub-pixel, and blue sub-pixel. The display driving circuit 120d may change the location of a partial image based on the coordinate value of the red sub-pixel. That is, when the coordinate value of a first red sub-pixel is (600, 500) and the coordinate value of a second red sub-pixel is (600, 300), the display driving circuit 120*d* may move a partial image by the difference between the coordinate values. As a specific method of moving the location of a partial image, the contents described in FIG. 5 may be applied.

In another embodiment, the display driving circuit 120*d* may adjust the brightness of a partial image based on color values of the green and blue sub-pixels included in the tracking pixels 612, 622, and 632. That is, when the grayscale values of the first green sub-pixel and the first blue sub-pixel are (223, 79), and the grayscale values of the second green sub-pixel and the second blue sub-pixel are (255, 255), the display driving circuit 120*d* may adjust the brightness of the partial image by the difference. As a specific method of adjusting the brightness of the partial image, the contents described in FIG. 5 may be applied.

Figure 7:
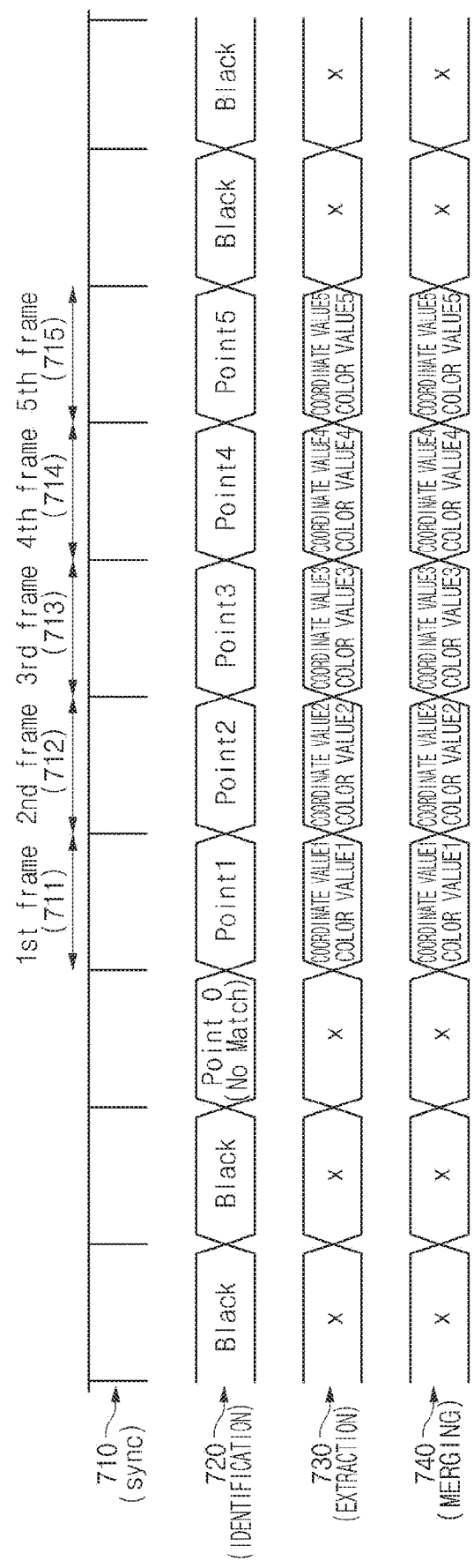
FIG. 7 is a diagram illustrating an operation of a display driving circuit according to an embodiment.

FIG. 7 is a diagram illustrating an operation of a display driving circuit according to an embodiment. The operation diagram illustrated in FIG. 7 illustrates an operation timing of the electronic device 100 for performing the embodiment illustrated in FIG. 5.

Referring to FIG. 7, a graph 710 shows a synchronization signal that enables the display 120 to operate at a constant speed. During one frame of the synchronization signal, the display 120 may output a specific image. For example, the display 120 may output a specific image for ⅙₀ sec.

A graph 720 shows the timing at which the display driving circuit 120*d* identifies the tracking point in the background image. For example, the display driving circuit 120*d* may identify the first tracking point 511*p* in a first frame 711 and the second tracking point 512*p* in a second frame 712.

A graph 730 shows the timing at which the display driving circuit 120*d* extracts a coordinate value and a color value from each tracking point. For example, the display driving circuit 120*d* may extract the coordinate value and the color value of the first tracking point 511*p* from the first frame 711. As another example, the display driving circuit 120*d* may extract the coordinate value and the color value of the second tracking point 512*p* from the second frame 712.

A graph 740 shows the timing at which the display driving circuit 120*d* applies the coordinate value and the color value extracted to the partial image. For example, the display driving circuit 120*d* may merge the first partial image 521 at a position corresponding to the coordinate value of the first tracking point 511*p* and output it to the display panel 120*p*. As another embodiment, the display driving circuit 120*d* may merge the second partial image 522 at a position corresponding to the coordinate value of the second tracking point 512*p* and output it to the display panel 120*p*.

According to an embodiment of the disclosure, a partial image may be merged into a background image based on the coordinate value and/or the color value of a tracking point, so that the partial image is merged into the background image in the same frame. Accordingly, the electronic device 100 may prevent screen flickering and output a background image and a partial image at a timing intended by a user.

According to an embodiment, an electronic device includes a housing, a display panel that is arranged in the housing, a display driving circuit that is electrically connected to the display panel, and a processor that generates a background image output through the display panel and transmits the background image to the display driving circuit, wherein the display driving circuit may determine whether a first object is displayed in a first area of the background image that is not exposed to an outside by the housing when the background image is received, generate a partial image having a size smaller than a size of the background image when the first object is not displayed as the determination result, and merge the partial image and a second area of the background image that is exposed to the outside and output a merging result through the display panel.

According to an embodiment, the display driving circuit may extract a color value of the first object and adjust brightness of the partial image based on the extracted color value.

According to an embodiment, the display driving circuit may generate an additional object in the first area when receiving the background image, and merge the partial image and the second area and output a merging result through the display panel.

According to an embodiment, the processor may generate the partial image, and the display driving circuit may include a memory that stores the partial image generated from the processor.

According to an embodiment, the display driving circuit may merge the partial image stored in the memory and the second area and output a merging result through the display panel.

According to an embodiment, the processor may transmit a background image that does not include the first object to the display driving circuit.

According to an embodiment, the display driving circuit may determine whether a second object is displayed in the second area, and may merge the partial image and the second area to output a merging result through the display panel when the second object is not displayed as the determination result.

According to an embodiment, the controller may extract a color value of the second object and adjust brightness of the partial image based on the extracted color value.

According to an embodiment, the processor may remove the second object from the second area and transmit a removing result to the display driving circuit.

According to an embodiment, an electronic device includes a display panel, a display driving circuit that is electrically connected to the display panel, and a processor that generates a background image output through the display panel and transmits the background image to the display driving circuit, wherein the display driving circuit may determine whether an object is displayed on the background image when the background image is received, generate a partial image corresponding to the object when the object is not displayed as the determination result, and output the partial image to the background image through the display panel.

According to an embodiment, the processor may transmit a background image that does not include the object to the display driving circuit.

According to an embodiment, the display driving circuit may extract a color value of the object and adjust brightness of the partial image based on the extracted color value.

According to an embodiment, the processor may generate the partial image, and the display driving circuit may include a memory that stores the partial image generated from the processor.

According to an embodiment, a display driving circuit includes a receiving circuit that sequentially receives a first background image and a second background image from an external processor, an up-scaler that is electrically connected to the receiving circuit and extract a first tracking point and a second tracking point generated in some areas of the first and second background images, and a controller that is electrically connected to the up-scaler, wherein the controller may generate a first partial image when the first background image is received from the receiving circuit, output the first partial image at a position corresponding to a coordinate value of the first tracking point on the first background image, generate a second partial image when the second background image is received from the receiving circuit, calculate a difference between the coordinate values of the first and second tracking points, and move the second partial image by a distance corresponding to the difference between the coordinate values of the first and second tracking points and output the second partial image onto the second background image.

According to an embodiment, the controller may calculate a difference between color values of the first and second tracking points, and adjust brightness of the second partial image based on the difference between the color values.

According to an embodiment, the second tracking point may be first recognized by the controller than the second partial image.

According to an embodiment, the first tracking point may include plural pieces of pixel information, and the controller may output the first partial image to a position corresponding to a coordinate value of a specified pixel among the plural pieces of pixel information.

According to an embodiment, the controller may adjust brightness of the first partial image based on a color value of the specified pixel.

According to an embodiment, the first and second partial images may be generated from the external processor, and the receiving circuit may receive the first and second partial images from the external processor.

According to an embodiment, the display driving circuit may further include a memory that stores the first and second partial images.

Figure 8:
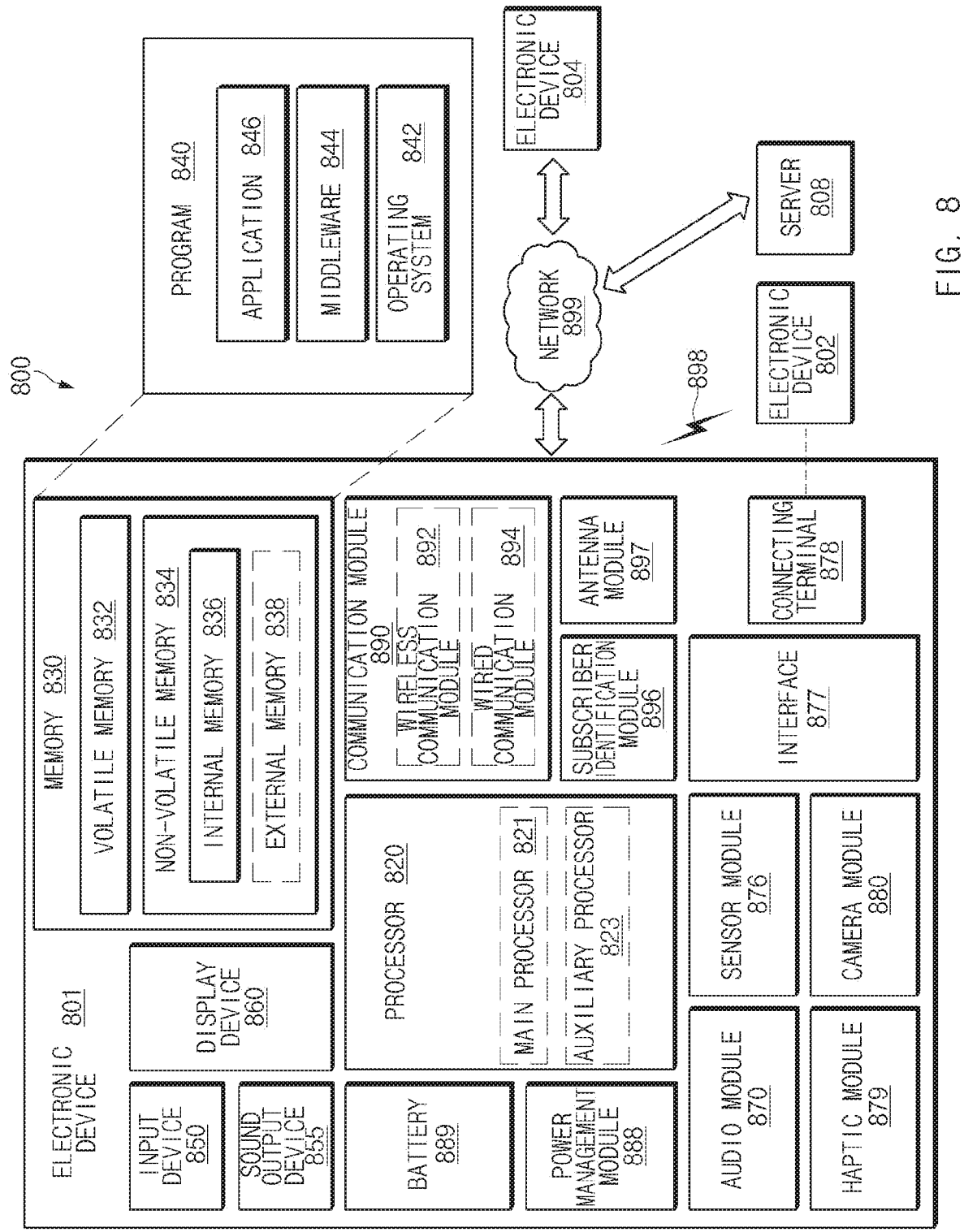
FIG. 8 is a block diagram of an electronic device in a network environment for synchronizing output timings of images in a low power state, according to various embodiments.

FIG. 8 is a block diagram of an electronic device in a network environment according to various embodiments.

Referring to FIG. 8, an electronic device 801 may communicate with an electronic device 802 through a first network 898 (e.g., a short-range wireless communication) or may communicate with an electronic device 804 or a server 808 through a second network 899 (e.g., a long-distance wireless communication) in a network environment 800. According to an embodiment, the electronic device 801 may communicate with the electronic device 804 through the server 808. According to an embodiment, the electronic device 801 may include a processor 820, a memory 830, an input device 850, a sound output device 855, a display device 860, an audio module 870, a sensor module 876, an interface 877, a haptic module 879, a camera module 880, a power management module 888, a battery 889, a communication module 890, a subscriber identification module 896, and an antenna module 897. According to some embodiments, at least one (e.g., the display device 860 or the camera module 880) among components of the electronic device 801 may be omitted or other components may be added to the electronic device 801. According to some embodiments, some components may be integrated and implemented as in the case of the sensor module 876 (e.g., a fingerprint sensor, an iris sensor, or an illuminance sensor) embedded in the display device 860 (e.g., a display).

The processor 820 may operate, for example, software (e.g., a program 840) to control at least one of other components (e.g., a hardware or software component) of the electronic device 801 connected to the processor 820 and may process and compute a variety of data. The processor 820 may load a command set or data, which is received from other components (e.g., the sensor module 876 or the communication module 890), into a volatile memory 832, may process the loaded command or data, and may store result data into a nonvolatile memory 834. According to an embodiment, the processor 820 may include a main processor 821 (e.g., a central processing unit or an application processor) and an auxiliary processor 823 (e.g., a graphic processing device, an image signal processor, a sensor hub processor, or a communication processor), which operates independently from the main processor 821, additionally or alternatively uses less power than the main processor 821, or is specified to a designated function. In this case, the auxiliary processor 823 may operate separately from the main processor 821 or embedded.

In this case, the auxiliary processor 823 may control, for example, at least some of functions or states associated with at least one component (e.g., the display device 860, the sensor module 876, or the communication module 890) among the components of the electronic device 801 instead of the main processor 821 while the main processor 821 is in an inactive (e.g., sleep) state or together with the main processor 821 while the main processor 821 is in an active (e.g., an application execution) state. According to an embodiment, the auxiliary processor 823 (e.g., the image signal processor or the communication processor) may be implemented as a part of another component (e.g., the camera module 880 or the communication module 890) that is functionally related to the auxiliary processor 823. The memory 830 may store a variety of data used by at least one component (e.g., the processor 820 or the sensor module 876) of the electronic device 801, for example, software (e.g., the program 840) and input data or output data with respect to commands associated with the software. The memory 830 may include the volatile memory 832 or the nonvolatile memory 834.

The program 840 may be stored in the memory 830 as software and may include, for example, an operating system 842, a middleware 844, or an application 846.

The input device 850 may be a device for receiving a command or data, which is used for a component (e.g., the processor 820) of the electronic device 801, from an outside (e.g., a user) of the electronic device 801 and may include, for example, a microphone, a mouse, or a keyboard.

The sound output device 855 may be a device for outputting a sound signal to the outside of the electronic device 801 and may include, for example, a speaker used for general purposes, such as multimedia play or recordings play, and a receiver used only for receiving calls. According to an embodiment, the receiver and the speaker may be either integrally or separately implemented.

The display device 860 may be a device for visually presenting information to the user of the electronic device 801 and may include, for example, a display, a hologram device, or a projector and a control circuit for controlling a corresponding device. According to an embodiment, the display device 860 may include a touch circuitry or a pressure sensor for measuring an intensity of pressure on the touch.

The audio module 870 may convert a sound and an electrical signal in dual directions. According to an embodiment, the audio module 870 may obtain the sound through the input device 850 or may output the sound through an external electronic device (e.g., the electronic device 802 (e.g., a speaker or a headphone)) wired or wirelessly connected to the sound output device 855 or the electronic device 801.

The sensor module 876 may generate an electrical signal or a data value corresponding to an operating state (e.g., power or temperature) inside or an environmental state outside the electronic device 801. The sensor module 876 may include, for example, a gesture sensor, a gyro sensor, a barometric pressure sensor, a magnetic sensor, an acceleration sensor, a grip sensor, a proximity sensor, a color sensor, an infrared sensor, a biometric sensor, a temperature sensor, a humidity sensor, or an illuminance sensor.

The interface 877 may support a designated protocol wired or wirelessly connected to the external electronic device (e.g., the electronic device 802). According to an embodiment, the interface 877 may include, for example, an HDMI (high-definition multimedia interface), a USB (universal serial bus) interface, an SD card interface, or an audio interface.

A connecting terminal 878 may include a connector that physically connects the electronic device 801 to the external electronic device (e.g., the electronic device 802), for example, an HDMI connector, a USB connector, an SD card connector, or an audio connector (e.g., a headphone connector).

The haptic module 879 may convert an electrical signal to a mechanical stimulation (e.g., vibration or movement) or an electrical stimulation perceived by the user through tactile or kinesthetic sensations. The haptic module 879 may include, for example, a motor, a piezoelectric element, or an electric stimulator.

The camera module 880 may shoot a still image or a video image. According to an embodiment, the camera module 880 may include, for example, at least one lens, an image sensor, an image signal processor, or a flash.

The power management module 888 may be a module for managing power supplied to the electronic device 801 and may serve as at least a part of a power management integrated circuit (PMIC).

The battery 889 may be a device for supplying power to at least one component of the electronic device 801 and may include, for example, a non-rechargeable (primary) battery, a rechargeable (secondary) battery, or a fuel cell.

The communication module 890 may establish a wired or wireless communication channel between the electronic device 801 and the external electronic device (e.g., the electronic device 802, the electronic device 804, or the server 808) and support communication execution through the established communication channel. The communication module 890 may include at least one communication processor operating independently from the processor 820 (e.g., the application processor) and supporting the wired communication or the wireless communication. According to an embodiment, the communication module 890 may include a wireless communication module 892 (e.g., a cellular communication module, a short-range wireless communication module, or a GNSS (global navigation satellite system) communication module) or a wired communication module 894 (e.g., an LAN (local area network) communication module or a power line communication module) and may communicate with the external electronic device using a corresponding communication module among them through the first network 898 (e.g., the short-range communication network such as a Bluetooth, a WiFi direct, or an IrDA (infrared data association)) or the second network 899 (e.g., the long-distance wireless communication network such as a cellular network, an internet, or a computer network (e.g., LAN or WAN)). The above-mentioned various communication modules 890 may be implemented into one chip or into separate chips, respectively.

According to an embodiment, the wireless communication module 892 may identify and authenticate the electronic device 801 using user information stored in the subscriber identification module 896 in the communication network.

The antenna module 897 may include one or more antennas to transmit or receive the signal or power to or from an external source. According to an embodiment, the communication module 890 (e.g., the wireless communication module 892) may transmit or receive the signal to or from the external electronic device through the antenna suitable for the communication method.

Some components among the components may be connected to each other through a communication method (e.g., a bus, a GPIO (general purpose input/output), an SPI (serial peripheral interface), or an MIPI (mobile industry processor interface)) used between peripheral devices to exchange signals (e.g., a command or data) with each other.

According to an embodiment, the command or data may be transmitted or received between the electronic device 801 and the external electronic device 804 through the server 808 connected to the second network 899. Each of the electronic devices 802 and 804 may be the same or different types as or from the electronic device 801. According to an embodiment, all or some of the operations performed by the electronic device 801 may be performed by another electronic device or a plurality of external electronic devices. When the electronic device 801 performs some functions or services automatically or by request, the electronic device 801 may request the external electronic device to perform at least some of the functions related to the functions or services, in addition to or instead of performing the functions or services by itself. The external electronic device receiving the request may carry out the requested function or the additional function and transmit the result to the electronic device 801. The electronic device 801 may provide the requested functions or services based on the received result as is or after additionally processing the received result. To this end, for example, a cloud computing, distributed computing, or client-server computing technology may be used.

Figure 9:
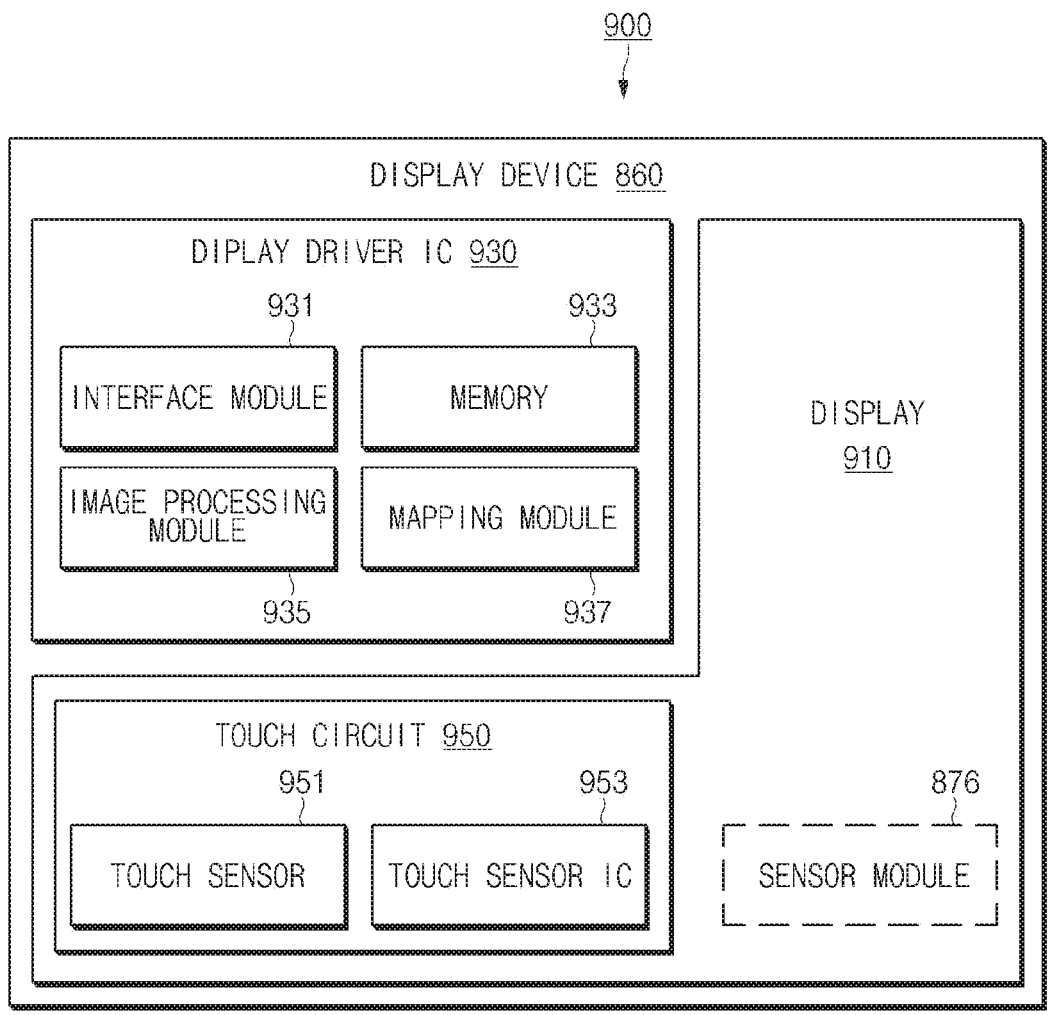
FIG. 9 is a block diagram of a display device for synchronizing output timings of images in a low power state, according to various embodiments.

FIG. 9 is a block diagram of a display device according to various embodiments.

Referring to FIG. 9, the display device 860 may include a display 910 and a display driver IC (DDI) 930 for controlling the display 910. The DDI 930 may include an interface module 931, a memory 933 (e.g., a buffer memory), an image processing module 935, or a mapping module 937. For example, the DDI 930 may receive image information including image data or an image control signal corresponding to a command for controlling the image data from a processor 820 (e.g., a main processor 821 or an application processor) or an auxiliary processor 823, which is operated independently of the main processor 821, through the interface module 931. The DDI 930 may communicate with a touch circuit 950, the sensor module 876, or the like through the interface module 931. In addition, the DDI 930 may store at least a part of the received image information in the memory 933, for example, in units of frames. For example, the image processing module 935 may perform preprocessing or post-processing (e.g., adjustment of resolution, brightness, or size) on at least a part of the image data based at least partially on characteristics of the image data or the display 910. The mapping module 937 may convert the image data preprocessed or post-processed through the image processing module 935 into a voltage value or a current value capable of driving the pixels, based at least partially on attributes of the pixels of the display 910

(e.g., an array of pixels (RGB stripe or pentile) or a size of each of subpixels). For example, at least some pixels of the display 910 may be driven based on the voltage or current value, such that visual information (e.g., a text, an image, or an icon) corresponding to the image data is displayed on the display 910.

According to an embodiment, the display device 860 may further include the touch circuit 950. The touch circuit 950 may include a touch sensor 951 and a touch sensor IC 953 for controlling the touch sensor 951. The touch sensor IC 953 may controls the touch sensor 951 to measure, for example, a change in a signal (e.g., a voltage, a light amount, a resistance, or a charge amount) at a specific position of the display 910 to sense a touch input or a hovering input, and may provide information (e.g., a location, an area, a pressure or a time) about the sensed touch input or hovering input to the processor 820. According to an embodiment, at least a part (e.g., the touch sensor IC 953) of the touch circuit 950 may be included as a part of the display driver IC 930 or the display 910, or as a part of another component (e.g., the auxiliary processor 823) arranged outside the display device 860.

According to an embodiment, the display device 860 may further include at least one sensor (e.g., a fingerprint sensor, an iris sensor, a pressure sensor or an illuminance sensor) of the sensor module 876, or a control circuitry thereof. In this case, the at least one sensor or the control circuitry thereof may be embedded in a part (e.g., the display 910 or the DDI 930) of the display device 860 or a part of the touch circuit 950. For example, when the sensor module 876 embedded in the display device 860 includes a biometric sensor (e.g., a fingerprint sensor), the biometric sensor may obtain biometric information associated with a touch input through an area of the display 910. As another example, when the sensor module 876 embedded in the display device 860 includes a pressure sensor, the pressure sensor may obtain information about a pressure corresponding to a touch input through an area or entire area of the display 910. According to an embodiment, the touch sensor 951 or the sensor module 876 may be arranged between pixels of the pixel layer of the display 910, or above or below the pixel layer.

The electronic device according to various embodiments disclosed in the present disclosure may be various types of devices. The electronic device may include, for example, at least one of a portable communication device (e.g., a smartphone), a computer device, a portable multimedia device, a mobile medical appliance, a camera, a wearable device, or a home appliance. The electronic device according to an embodiment should not be limited to the above-mentioned devices.

It should be understood that various embodiments of the present disclosure and terms used in the embodiments do not intend to limit technologies disclosed in the present disclosure to the particular forms disclosed herein; rather, the present disclosure should be construed to cover various modifications, equivalents, and/or alternatives of embodiments of the present disclosure. With regard to description of drawings, similar components may be assigned with similar reference numerals. As used herein, singular forms may include plural forms as well unless the context clearly indicates otherwise. In the present disclosure disclosed herein, the expressions "A or B", "at least one of A or/and B", "A, B, or C" or "one or more of A, B, or/and C", and the like used herein may include any and all combinations of one or more of the associated listed items. The expressions "a first", "a second", "the first", or "the second", used in herein, may refer to various components regardless of the order and/or the importance, but do not limit the corresponding components. The above expressions are used merely for the purpose of distinguishing a component from the other components. It should be understood that when a component (e.g., a first component) is referred to as being (operatively or communicatively) "connected," or "coupled," to another component (e.g., a second component), it may be directly connected or coupled directly to the other component or any other component (e.g., a third component) may be interposed between them.

The term "module" used herein may represent, for example, a unit including one or more combinations of hardware, software and firmware. The term "module" may be interchangeably used with the terms "logic", "logical block", "part" and "circuit". The "module" may be a minimum unit of an integrated part or may be a part thereof. The "module" may be a minimum unit for performing one or more functions or a part thereof. For example, the "module" may include an application-specific integrated circuit (ASIC).

Various embodiments of the present disclosure may be implemented by software (e.g., the program 840) including an instruction stored in a machine-readable storage media (e.g., an internal memory 836 or an external memory 838) readable by a machine (e.g., a computer). The machine may be a device that calls the instruction from the machine-readable storage media and operates depending on the called instruction and may include the electronic device (e.g., the electronic device 801). When the instruction is executed by the processor (e.g., the processor 820), the processor may perform a function corresponding to the instruction directly or using other components under the control of the processor. The instruction may include a code generated or executed by a compiler or an interpreter. The machine-readable storage media may be provided in the form of non-transitory storage media. Here, the term "non-transitory", as used herein, is a limitation of the medium itself (i.e., tangible, not a signal) as opposed to a limitation on data storage persistency.

According to an embodiment, the method according to various embodiments disclosed in the present disclosure may be provided as a part of a computer program product. The computer program product may be traded between a seller and a buyer as a product. The computer program product may be distributed in the form of machine-readable storage medium (e.g., a compact disc read only memory (CD-ROM)) or may be distributed only through an application store (e.g., a Play Store™). In the case of online distribution, at least a portion of the computer program product may be temporarily stored or generated in a storage medium such as a memory of a manufacturer's server, an application store's server, or a relay server.

Each component (e.g., the module or the program) according to various embodiments may include at least one of the above components, and a portion of the above sub-components may be omitted, or additional other sub-components may be further included. Alternatively or additionally, some components (e.g., the module or the program) may be integrated in one component and may perform the same or similar functions performed by each corresponding components prior to the integration. Operations performed by a module, a programming, or other components according to various embodiments of the present disclosure may be executed sequentially, in parallel, repeatedly, or in a heuristic method. Also, at least some operations may be executed in different sequences, omitted, or other operations may be added.

The invention claimed is:

1. An electronic device comprising:
a housing,
a display panel arranged in the housing,
a display driving circuit electrically connected to the display panel, and
a processor configured to generate a background image output through the display panel and transmit the background image to the display driving circuit,
wherein the display driving circuit is configured to:
determine whether a first object is displayed in a first area of the background image that is not exposed to an outside by the housing when the background image is received,
generate a partial image having a size smaller than a size of the background image when the first object is not displayed as the determination result, and
merge the partial image and a second area of the background image that is exposed to the outside and output a merging result through the display panel.

2. The electronic device of claim 1, wherein the display driving circuit is configured to extract a color value of the first object and adjust brightness of the partial image based on the extracted color value.

3. The electronic device of claim 1, wherein the display driving circuit is configured to:
generate an additional object in the first area when receiving the background image, and
merge the partial image and the second area and output a merging result through the display panel.

4. The electronic device of claim 1, wherein the processor is configured to generate the partial image, and
wherein the display driving circuit includes a memory configured to store the partial image generated from the processor.

5. The electronic device of claim 4, wherein the display driving circuit is configured to merge the partial image stored in the memory and the second area and output a merging result through the display panel.

6. The electronic device of claim 1, wherein the processor is configured to transmit a background image that does not include the first object to the display driving circuit.

7. The electronic device of claim 1, wherein the display driving circuit is configured to:
determine whether a second object is displayed in the second area, and
merge the partial image and the second area to output a merging result through the display panel when the second object is not displayed as the determination result.

8. The electronic device of claim 7, wherein the controller is configured to extract a color value of the second object and adjust brightness of the partial image based on the extracted color value.

9. The electronic device of claim 7, wherein the processor is configured to remove the second object from the second area and transmit a removing result to the display driving circuit.

10. A display driving circuit comprising:
a receiving circuit configured to sequentially receive a first background image and a second background image from an external processor,
an up-scaler electrically connected to the receiving circuit and extract a first tracking point and a second tracking point generated in some areas of the first background image and the second background image, and
a controller electrically connected to the up-scaler,
wherein the controller is configured to:
generate a first partial image when the first background image is received from the receiving circuit,
output the first partial image at a position corresponding to a coordinate value of the first tracking point on the first background image,
generate a second partial image when the second background image is received from the receiving circuit,
calculate a difference between the coordinate values of the first tracking point and the second tracking point,
move the second partial image from the coordinate value of the first tracking point by a distance corresponding to the difference between the coordinate values of the first tracking point and the second tracking point and output the second partial image onto the second background image.

11. The display driving circuit of claim 10, wherein the controller is configured to:
calculate a difference between color values of the first tracking point and the second tracking point, and
adjust brightness of the second partial image based on the difference between the color values.

12. The display driving circuit of claim 10, wherein the second tracking point is first recognized by the controller than the second partial image.

13. The display driving circuit of claim 10, wherein the first tracking point includes plural pieces of pixel information, and
wherein the controller is configured to output the first partial image to a position corresponding to a coordinate value of a specified pixel among the plural pieces of pixel information.

14. The display driving circuit of claim 13, wherein the controller is configured to adjust brightness of the first partial image based on a color value of the specified pixel.

15. The display driving circuit of claim 10, wherein the first partial image and the second partial image are generated from the external processor, and
wherein the receiving circuit is configured to receive the first partial image and the second partial image from the external processor.

* * * * *